(12) United States Patent
Bai et al.

(10) Patent No.: US 11,867,231 B2
(45) Date of Patent: Jan. 9, 2024

(54) DEEP GROOVE BALL BEARING WITH CAGE

(71) Applicant: C&U COMPANY LIMITED., WenZhou (CN)

(72) Inventors: Xuefeng Bai, WenZhou (CN); Jialiang Xu, WenZhou (CN); Lizhao Liu, WenZhou (CN)

(73) Assignee: C&U COMPANY LIMITED., Wenzhou (CN)

( * ) Notice: Subject to any disclaimer, the term of this patent is extended or adjusted under 35 U.S.C. 154(b) by 71 days.

(21) Appl. No.: 18/008,678

(22) PCT Filed: Sep. 16, 2021

(86) PCT No.: PCT/CN2021/118719
§ 371 (c)(1),
(2) Date: Dec. 7, 2022

(87) PCT Pub. No.: WO2023/272954
PCT Pub. Date: Jan. 5, 2023

(65) Prior Publication Data
US 2023/0193954 A1    Jun. 22, 2023

(30) Foreign Application Priority Data
Jun. 30, 2021 (CN) .......................... 202110736974.6

(51) Int. Cl.
*F16C 33/38* (2006.01)
*F16C 19/16* (2006.01)
(Continued)

(52) U.S. Cl.
CPC .......... *F16C 33/3875* (2013.01); *F16C 19/16* (2013.01); *F16C 33/583* (2013.01);
(Continued)

(58) Field of Classification Search
CPC .... F16C 33/3862–3875; F16C 33/6651; F16C 19/16; F16C 33/583; F16C 2226/70
See application file for complete search history.

(56) References Cited

U.S. PATENT DOCUMENTS 6,302,252 B1 * 10/2001 Iga ...................... F16C 33/3875
192/41 A
10,151,348 B2    12/2018 Kamath
(Continued)

FOREIGN PATENT DOCUMENTS

CN    203926406 U    11/2014
CN    204553567 U    8/2015
(Continued)

OTHER PUBLICATIONS

Machine Translation of JP-2006258174-A (Year: 2006).*
(Continued)

*Primary Examiner* — Alan B Waits
(74) *Attorney, Agent, or Firm* — Bayramoglu Law Offices LLC

(57) ABSTRACT

A deep groove ball bearing includes an outer ring, an inner ring, a cage, and steel balls. The cage is provided between the outer ring and the inner ring. Pockets are formed in the cage, and the steel balls are placed in the pockets. The cage is split into an upper cage body and a lower cage body. Pocket grooves are formed alternately in each of the upper cage body and the lower cage body. A connecting portion is provided between adjacent pocket grooves in the upper cage body. A positioning portion is provided between adjacent pocket grooves in the lower cage body. An insertion piece and an insertion groove are provided between the connecting portion and the positioning portion. The insertion piece and the insertion groove are configured to be fixed with each (Continued)

other to form a fixed connection between the upper cage body and the lower cage body.

2 Claims, 9 Drawing Sheets

(51) Int. Cl.
*F16C 33/58* (2006.01)
*F16C 33/66* (2006.01)

(52) U.S. Cl.
CPC ...... *F16C 33/6651* (2013.01); *F16C 2208/04* (2013.01); *F16C 2208/62* (2013.01); *F16C 2226/70* (2013.01)

(56) References Cited

U.S. PATENT DOCUMENTS

| | | | | |
|---|---|---|---|---|
| 2014/0064649 | A1* | 3/2014 | Fukama | F16C 33/6651 |
| | | | | 384/484 |
| 2017/0292567 | A1* | 10/2017 | Taniguchi | F16C 33/3875 |
| 2017/0314619 | A1* | 11/2017 | Tsuji | F16C 33/3887 |
| 2018/0010641 | A1* | 1/2018 | Chougule | F16C 33/6629 |
| 2021/0262523 | A1 | 8/2021 | Ince et al. | |

FOREIGN PATENT DOCUMENTS

| | | | | |
|---|---|---|---|---|
| CN | 204677601 U | | 9/2015 | |
| CN | 105452690 A | | 3/2016 | |
| CN | 105822673 A | | 8/2016 | |
| CN | 206439302 U | | 8/2017 | |
| CN | 206668759 U | | 11/2017 | |
| CN | 209469714 U | | 10/2019 | |
| CN | 209781472 U | | 12/2019 | |
| CN | 111503157 A | | 8/2020 | |
| CN | 112112899 A | | 12/2020 | |
| CN | 213684982 U | | 7/2021 | |
| EP | 3267059 A1 | | 1/2018 | |
| GB | 191401179 A | | 2/1914 | |
| JP | 2006258174 A | * | 9/2006 | .......... F16C 33/3875 |
| JP | 2006292097 A | * | 10/2006 | .......... F16C 33/3875 |
| JP | 2006300261 A | * | 11/2006 | .......... F16C 33/3875 |
| JP | 2007040383 A | * | 2/2007 | .......... F16C 33/3875 |
| WO | 2015105110 A1 | | 7/2015 | |

OTHER PUBLICATIONS

Machine Translation of JP-2006292097-A (Year: 2006).*
Machine Translation of JP-2006300261-A (Year: 2006).*
Machine Translation of JP-2007040383-A (Year: 2007).*
Machine Translation of CN209469714 (Year: 2019).*

* cited by examiner

DEEP GROOVE BALL BEARING WITH CAGE

CROSS REFERENCE TO THE RELATED APPLICATIONS

This application is the national phase entry of International Application No. PCT/CN2021/118719, filed on Sep. 16, 2021, which is based upon and claims priority to Chinese Patent Application No. 202110736974.6, filed on Jun. 30, 2021, the entire contents of which are incorporated herein by reference.

TECHNICAL FIELD

The present disclosure relates to the technical field of bearings and, in particular, to a deep groove ball bearing with a cage.

BACKGROUND

Instead of engines of conventional fuel vehicles, drive motors have become key components of new energy vehicles and have the advantages of increased instantaneous power; strong overload capacity; wide speed range; the capability of being frequently started, stopped, accelerated, and decelerated; high torque in low-speed climbing; and low torque in high-speed driving over common motors. It is precisely because of these characteristics of the driving motors that the performance requirement of bearings in the driving motors is higher than that of the general bearing. Bearings in the drive motors are required to have high-speed performance, rapid speed change, low torque, low noise, low-temperature rise, long service life, and the like. To enable the rapid acceleration of the new energy vehicles, a deep groove ball bearing having a high rotational speed is typically provided in the drive motors. A cage is provided in the deep groove ball bearing, and the cage is assembled between an inner raceway and an outer raceway. The cage includes an annular main body and ball pockets uniformly distributed along the circumference of the annular main body. The ball pockets each have a concave spherical surface, which is similar to that of a rolling element of a ball bearing and has a slightly larger radius of curvature. An opening is separately formed in the inner diameter surface and the outer diameter surface of the main body of the cage. However, in the case of rapid acceleration or deceleration, a high-temperature rise occurs easily, such that the cage is molten and separated or even fractured at the ball pockets or other positions to affect the overall use effect of the cage. Moreover, existing cages are assembled and produced cumbersomely with undesirable production efficiency.

SUMMARY

Given the deficiencies of the prior art, the present disclosure provides a deep groove ball bearing with a cage, which provides a simple structure, easy installation into the overall structure, higher stability, a better use effect of the overall structure, and higher production efficiency.

To achieve the above-mentioned objective, the present disclosure provides a deep groove ball bearing with a cage, including an outer ring, an inner ring, the cage, and steel balls. The cage is provided between the outer ring and the inner ring. Pockets are formed in the cage, and the steel balls are placed in the pockets. The cage is split into an upper cage body and a lower cage body. Pocket grooves are formed alternately in each of the upper cage body and the lower cage body. Pocket grooves in the upper cage body and the lower cage body are combined correspondingly to form the pockets. A connecting portion is provided between adjacent pocket grooves in the upper cage body. A positioning portion is provided between adjacent pocket grooves in the lower cage body. An insertion piece and an insertion groove are provided between the connecting portion and the positioning portion, and the insertion piece and the insertion groove are configured to be fixed with each other to form a fixed connection between the upper cage body and the lower cage body.

The arrangement has the following beneficial effects: Through the structure, the cage can be split into the upper cage body and the lower cage body. The steel balls can be installed and placed conveniently through the upper cage body and the lower cage body, and the two cage bodies are connected by a connection piece, which achieves a convenient and efficient connection and a simple structure. Preferably, the cage bodies are made of an injection molding material, which is usually glass fiber reinforced polyamide 66 (PA66), glass fiber reinforced PA46, and glass fiber reinforced polyetheretherketone (PEEK), thereby ensuring the strength of the cage, yielding a lightweight cage body, maintaining a stability of the bearing, and achieving the better use effect.

As a further arrangement of the present disclosure, the insertion groove is formed in the positioning portion of the lower cage body, a bump is provided in the insertion groove, the insertion piece is provided on the connecting portion of the upper cage body, a clamping member is provided on an end portion of the insertion piece, and the clamping member is clamped between the bump and a bottom of the insertion groove.

The arrangement has the following beneficial effects: The insertion piece and the insertion groove are cooperatively inserted, and the clamping member on the insertion piece abuts against the bump, which prevents the upper cage body and the lower cage body from loosening, and achieves the simple structure, and the convenient and efficient connection.

As a further arrangement of the present disclosure, the bump is arranged adjacent to an inserting port of the insertion groove, and a contact surface of the bump and the clamping member is an arc surface.

The arrangement has the following beneficial effects: The clamping member is clamped more smoothly, which makes installation and production smoother and improves production efficiency.

As a further arrangement of the present disclosure, a positioning piece is respectively provided at two sides of the insertion piece, the positioning piece is elastic, and an accommodating groove is formed in a position of the insertion groove corresponding to the positioning piece.

The arrangement has the following beneficial effects: The two cage bodies are connected more firmly and are not loosened easily. In case of a force for separating the two cage bodies, the positioning piece can provide a counterforce to prevent the separation, thereby improving the stability of the overall structure.

As a further arrangement of the present disclosure, the insertion groove communicates with the pocket groove through the accommodating groove, and an oil storage cotton is provided in the accommodating groove.

The arrangement has the following beneficial effects: The insertion groove communicates with the pocket groove, and the oil storage cotton is provided in the accommodating groove. Upon installation of the cage bodies, the positioning piece at each of two sides of the insertion piece is clamped into the accommodating groove and abuts against the oil storage cotton. Consequently, the oil storage cotton abuts against the steel ball, and a lubricant in the oil storage cotton can be coated on the steel ball, thereby lubricating and cooling the steel ball to effectively prolong the service life of the overall structure.

As a further arrangement of the present disclosure, the insertion groove is formed in the positioning portion of the lower cage body, the insertion piece is provided on the connecting portion of the upper cage body, the insertion piece is provided as two connecting arms, the connecting arm includes one end connected to the connecting portion and the other end provided with a hook, the connecting arm passes through the insertion groove, and the hook is hooked on the outer wall of the positioning portion.

The arrangement has the following beneficial effects: The connecting arms are connected more firmly to improve overall stability. Meanwhile, the double-arm structure is not loosened easily to achieve a better use effect of the overall structure.

As a further arrangement of the present disclosure, the hook is provided in a wedge shape, and the contact surface of the hook and the insertion groove is an inclined surface.

The arrangement has the following beneficial effects: With such a structure of the connecting arm, the structure is simple, and the connecting effect is desirable. The contact surface of the hook and the insertion groove is the inclined surface, such that the desirable guiding effect is achieved during insertion, the clamping effect is improved, and the structure is simple for implementation.

As a further arrangement of the present disclosure, a connecting bridge is provided between the two connecting arms.

The arrangement has the following beneficial effects: The connecting arms have a higher strength, are not susceptible to deformation, and are inserted conveniently for assembly, thereby achieving a better use effect of the overall structure.

As a further arrangement of the present disclosure, the connecting portion on the upper cage body is lower than the bottom of the pocket groove, and the length of the hook is less than the distance between the connecting portion and the bottom of the pocket groove.

The arrangement has the following beneficial effects: The cage is arranged more reasonably, does not cause interference with a dust cover in installation, and makes the overall structure more compact, thereby improving the stability of the overall structure in use.

As a further arrangement of the present disclosure, a first connecting step is provided on the inner wall of the outer ring, a second connecting step is provided on the outer wall of the inner ring, and a dust cover is clamped between the first connecting step and the second connecting step.

The arrangement has the following beneficial effects: The steel balls are shielded to achieve a better use effect of the overall structure. In addition, while effectively preventing leakage of the lubricant, and improving the overall lubricating effect, the structure is simple for implementation

DETAILED DESCRIPTION OF THE EMBODIMENTS

Figure 1:
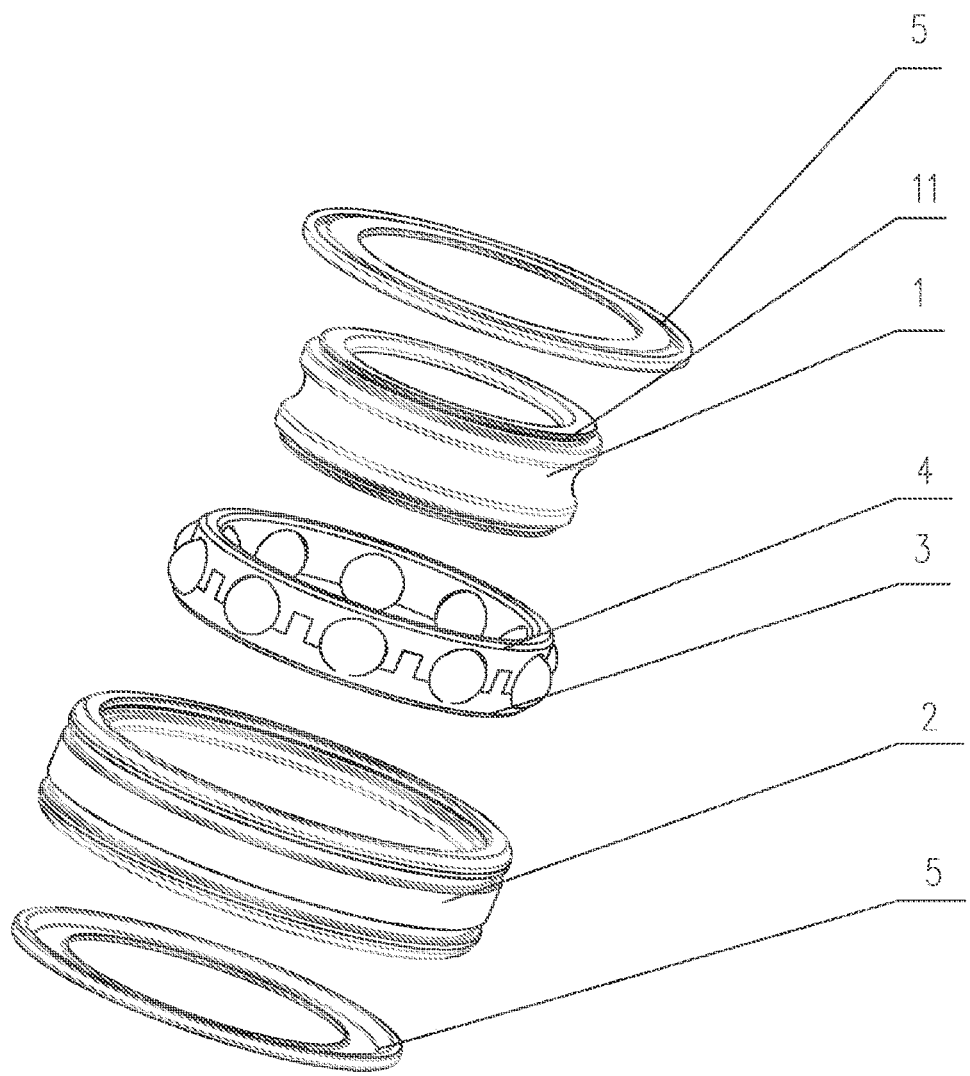
FIG. 1 is an exploded perspective view according to a first embodiment of the present disclosure.
Figure 2:
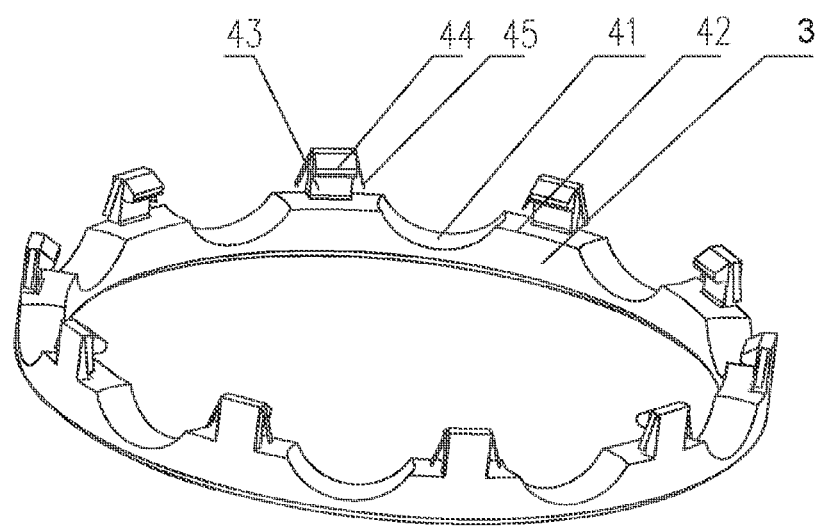
FIG. 2 is a structural perspective view of a lower cage body according to a first embodiment of the present disclosure.
Figure 3:
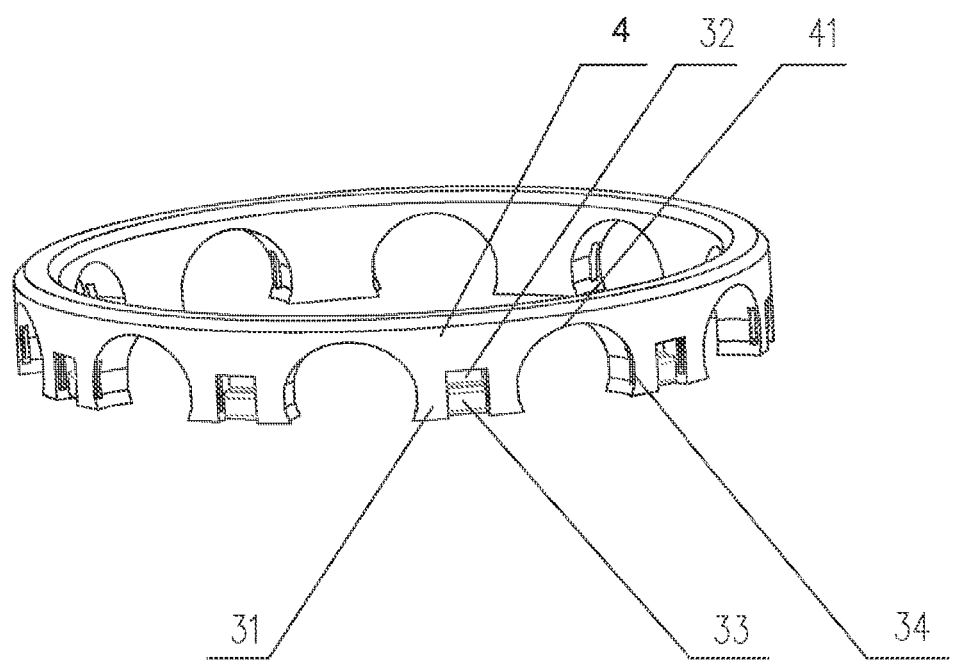
FIG. 3 is a structural perspective view of a upper cage body according to a first embodiment of the present disclosure.
Figure 4:
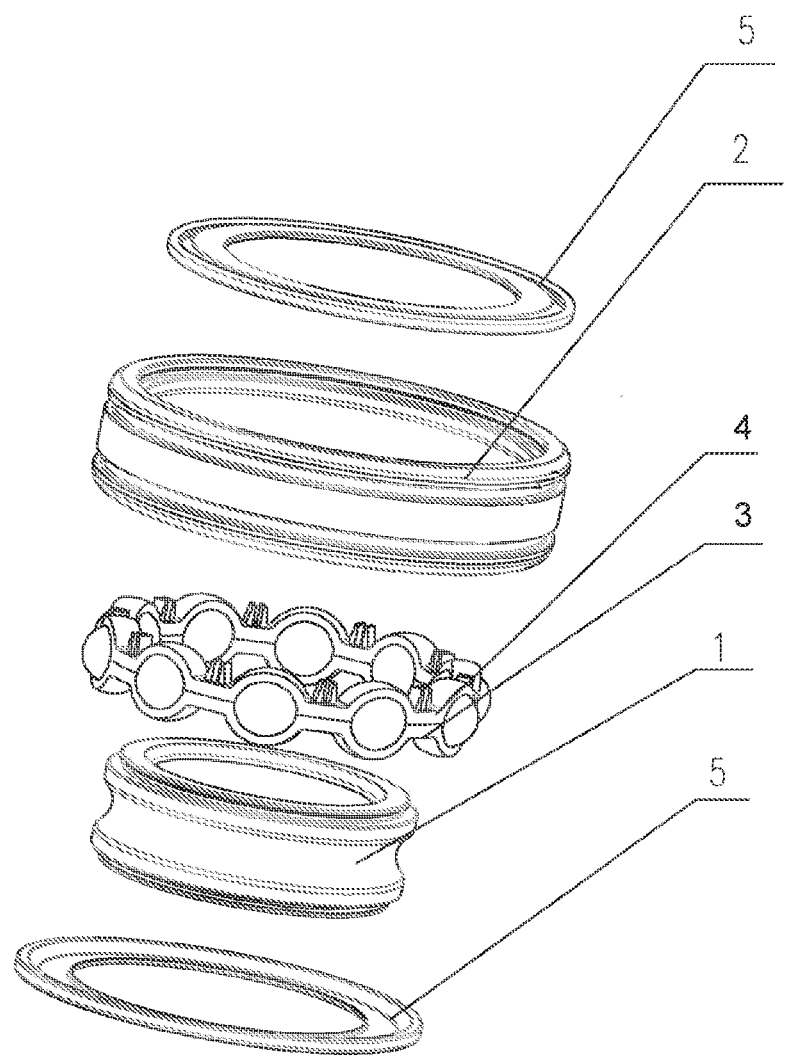
FIG. 4 is a exploded perspective view according to a second embodiment of the present disclosure.
Figure 5:
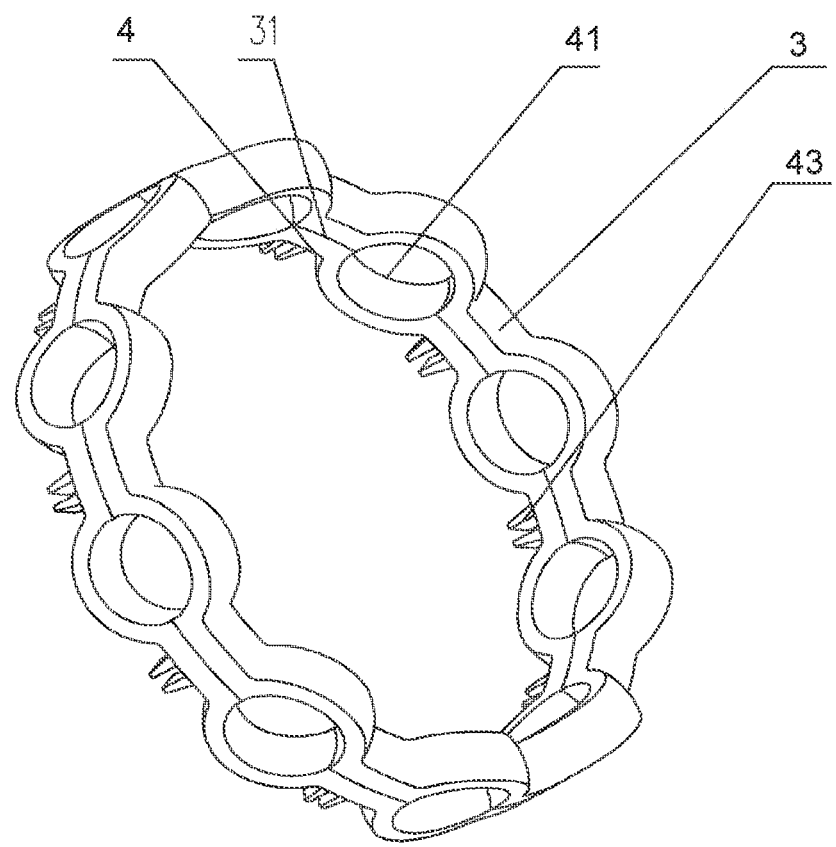
FIG. 5 is a structural perspective view of a cage according to a second embodiment of the present disclosure.
Figure 6:
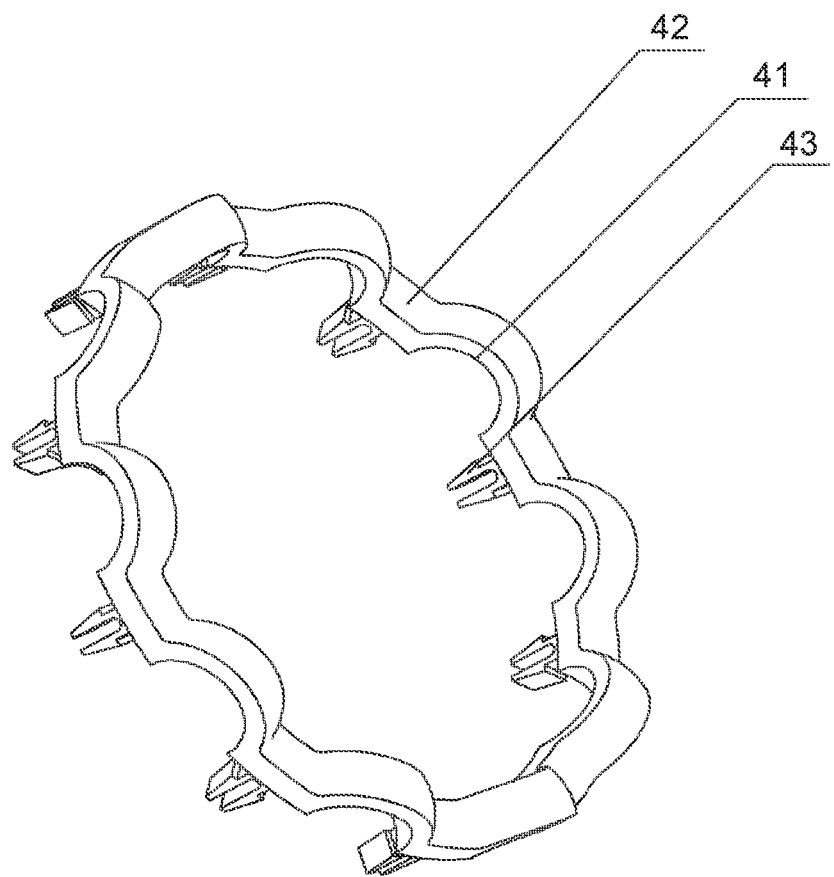
FIG. 6 is a structural perspective view of a lower cage body according to a second embodiment of the present disclosure.
Figure 7:
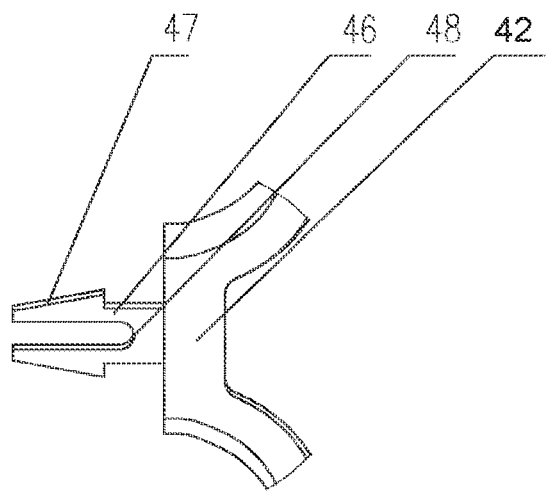
FIG. 7 is a partially enlarged view of a pair of connecting arms according to a second embodiment of the present disclosure.

As shown in FIGS. 1 through 3, according to a first embodiment of the present disclosure, a deep groove ball bearing with a cage includes outer ring 2, inner ring 1, a cage, and steel balls. The cage is provided between the outer ring 2 and the inner ring 1. Pockets are formed in the cage. The steel balls are placed in the pockets. The cage is split into upper cage body 4 and lower cage body 3. Pocket grooves 41 are formed alternately in each of the upper cage body 4 and the lower cage body 3. Pocket grooves 41 in the upper cage body 4 and the lower cage body 3 are combined correspondingly to form the pockets. Connecting portion 42 is provided between adjacent pocket grooves 41 in the lower cage body 3. Positioning portion 31 is provided between adjacent pocket grooves 41 in the upper cage body 4. Insertion piece 43 and insertion groove 32 are provided between the connecting portion 42 and the positioning portion 31. The insertion piece 43 and the insertion groove 32 are configured to be fixed with each other to form a fixed connection between the lower cage body 3 and the upper cage body 4. The insertion groove 32 is formed in the positioning portion 31 of the upper cage body 4. Bump 33 is provided in the insertion groove 32. The insertion piece 43 is provided on the connecting portion 42 of the lower cage body 3. Clamping member 44 is provided on an end portion of the insertion piece 43. The clamping member 44 is clamped between the bump 33 and the bottom of the insertion groove 32. The bump 33 is arranged adjacent to an inserting port of the insertion groove 32. The contact surface of the bump 33 and the clamping member 44 is an arc surface. A first connecting step is provided on the inner wall of the outer ring 2. Second connecting step 11 is provided on the outer wall of the inner ring 1. Dust cover 5 is clamped between the first connecting step and the second connecting step 11.

As shown in FIGS. through 3, according to a first embodiment of the present disclosure, a deep groove ball bearing with a cage includes outer ring 2, inner ring 1, a cage, and steel balls. The cage is provided between the outer ring 2 and the inner ring 1. Pockets are formed in the cage. The steel balls are placed in the pockets. The cage is split into upper cage body 4 and lower cage body 3. Pocket grooves 41 are formed alternately in each of the upper cage body 4 and the lower cage body 3. Pocket grooves 41 in the upper cage body 4 and the lower cage body 3 are combined correspondingly to form the pockets. Connecting portion 42 is provided between adjacent pocket grooves 41 in the lower cage body 3. Positioning portion 31 is provided between adjacent pocket grooves 41 in the upper cage body 4. Insertion piece 43 and insertion groove 32 are provided between the connecting portion 42 and the positioning portion 31. The insertion piece 43 and the insertion groove 32 are configured to be fixed with each other to form a fixed connection between the lower cage body 3 and the upper cage body 4. The insertion groove 32 is formed in the positioning portion 31 of the upper cage body 4. Bump 33 is provided in the insertion groove 32. The insertion piece 43 is provided on the connecting portion 42 of the lower cage body 3. Clamping member 44 is provided on an end portion of the insertion piece 43. The clamping member 44 is clamped between the bump 33 and the bottom of the insertion groove 32. The bump 33 is arranged adjacent to an inserting port of the insertion groove 32. A contact surface of the bump 33 and the clamping member 44 is an arc surface. Positioning piece 45 is respectively provided at two sides of the insertion piece 43. The positioning piece 45 is elastic. Accommodating groove 34 is formed in a position of the insertion groove 32 corresponding to the positioning piece 45. The insertion groove 32 communicates with the pocket groove 41 through the accommodating groove 34. An oil storage cotton is provided in the accommodating groove 34. A first connecting step is provided on the inner wall of the outer ring 2. Second connecting step 11 is provided on the outer wall of the inner ring 1. Dust cover 5 is clamped between the first connecting step and the second connecting step 11.

As shown in FIGS. 4 through 9, according to a second embodiment of the present disclosure, a deep groove ball bearing with a cage includes outer ring 2, inner ring 1, a cage, and steel balls. The cage is provided between the outer ring 2 and the inner ring 1. Pockets are formed in the cage. The steel balls are placed in the pockets. The cage is split into upper cage body 4 and lower cage body 3. Pocket grooves 41 are formed alternately in each of the upper cage body 4 and the lower cage body 3. Pocket grooves 41 in the upper cage body 4 and the lower cage body 3 are combined correspondingly to form the pockets. Connecting portion 42 is provided between adjacent pocket grooves 41 in the lower cage body 3. Positioning portion 31 is provided between adjacent pocket grooves 41 in the upper cage body 4. Insertion piece 43 and insertion groove are provided between the connecting portion 42 and the positioning portion 31. The insertion piece 43 and the insertion groove are configured to be fixed with each other to form a fixed connection between the lower cage body 3 and the upper cage body 4. The insertion groove is formed in the positioning portion 31 of the upper cage body 4. The insertion piece 43 is provided on the connecting portion 42 of the lower cage body 3. The insertion piece 43 is provided as a pair of connecting arms 46. The pair of connecting arms 46 includes one end connected to the connecting portion 42 and the other end provided with hook 47. The pair of connecting arms 46 passes through the insertion groove, and the hook 47 is hooked on the outer wall of the positioning portion 31. The hook 47 is provided in a wedge shape. A contact surface of the hook 47 and the insertion groove is an inclined surface. Connecting bridge 48 is provided between the pair of connecting arms 46. The connecting portion 42 on the lower cage body 3 is lower than the bottom of the pocket groove 41. The length of hook 47 is less than the distance between the connecting portion 42 and the bottom of the pocket groove 41. A first connecting step is provided on the inner wall of the outer ring 2. Second connecting step 11 is provided on the outer wall of the inner ring 1. Dust cover 5 is clamped between the first connecting step and the second connecting step 11.

As shown in FIGS. 4 through 9, according to a second embodiment of the present disclosure, a deep groove ball bearing with a cage includes outer ring 2, inner ring 1, a cage, and steel balls. The cage is provided between the outer ring 2 and the inner ring 1. Pockets are formed in the cage. The steel balls are placed in the pockets. The cage is split into upper cage body 4 and lower cage body 3. Pocket grooves 41 are formed alternately in each of the upper cage body 4 and the lower cage body 3. Pocket grooves 41 in the upper cage body 4 and the lower cage body 3 are combined correspondingly to form the pockets. Connecting portion 42 is provided between adjacent pocket grooves 41 in the lower cage body 3. Positioning portion 31 is provided between adjacent pocket grooves 41 in the upper cage body 4. Insertion piece 43 and insertion groove are provided between the connecting portion 42 and the positioning portion 31. The insertion piece 43 and the insertion groove are configured to be fixed with each other to form a fixed connection between the lower cage body 3 and the upper cage body 4. The insertion groove is formed in the positioning portion 31 of the upper cage body 4. The insertion piece 43 is provided on the connecting portion 42 of the lower cage body 3. The insertion piece 43 is provided as a pair of connecting arms 46. The pair of connecting arms 46 include one end connected to the connecting portion 42 and the other end provided with hook 47. The pair of connecting arms 46 pass through the insertion groove, and the hook 47 is hooked on the outer wall of the positioning portion 31. The hook 47 is provided in a wedge shape. A contact surface of the hook 47 and the insertion groove is an inclined surface. Connecting bridge 48 is provided between the pair of connecting arms 46. The connecting portion 42 on the lower cage body 3 is lower than the bottom of the pocket groove 41. The length of hook 47 is less than the distance between the connecting portion 42 and the bottom of the pocket groove 41.

As shown in FIGS. 4 through 9, according to a second embodiment of the present disclosure, a deep groove ball bearing with a cage includes outer ring 2, inner ring 1, a cage, and steel balls. The cage is provided between the outer ring 2 and the inner ring 1. Pockets are formed in the cage. The steel balls are placed in the pockets. The cage is split into upper cage body 4 and lower cage body 3. Pocket grooves 41 are formed alternately in each of the upper cage body 4 and the lower cage body 3. Pocket grooves 41 in the upper cage body 4 and the lower cage body 3 are combined correspondingly to form the pockets. Connecting portion 42 is provided between adjacent pocket grooves 41 in the lower cage body 3. Positioning portion 31 is provided between adjacent pocket grooves 41 in the upper cage body 4. Insertion piece 43 and insertion groove are provided between the connecting portion 42 and the positioning portion 31. The insertion piece 43 and the insertion groove are configured to be fixed with each other to form a fixed connection between the lower cage body 3 and the upper cage body 4. The insertion groove is formed in the positioning portion 31 of the upper cage body 4. The insertion piece 43 is provided on the connecting portion 42 of the lower cage body 3. The insertion piece 43 is provided as a pair of connecting arms 46. The pair of connecting arms 46 include one end connected to the connecting portion 42 and the other end provided with hook 47. The pair of connecting arms 46 pass through the insertion groove, and the hook 47 is hooked on the outer wall of the positioning portion 31.

Figure 8:
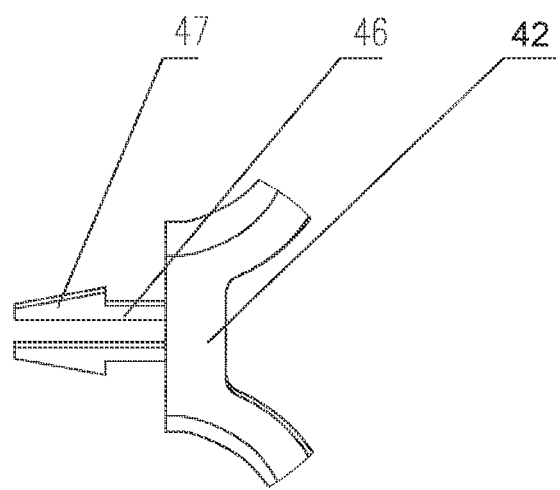
FIG. 8 is a partially enlarged view of a modified pair of connecting arms according to a second embodiment of the present disclosure.
Figure 9:
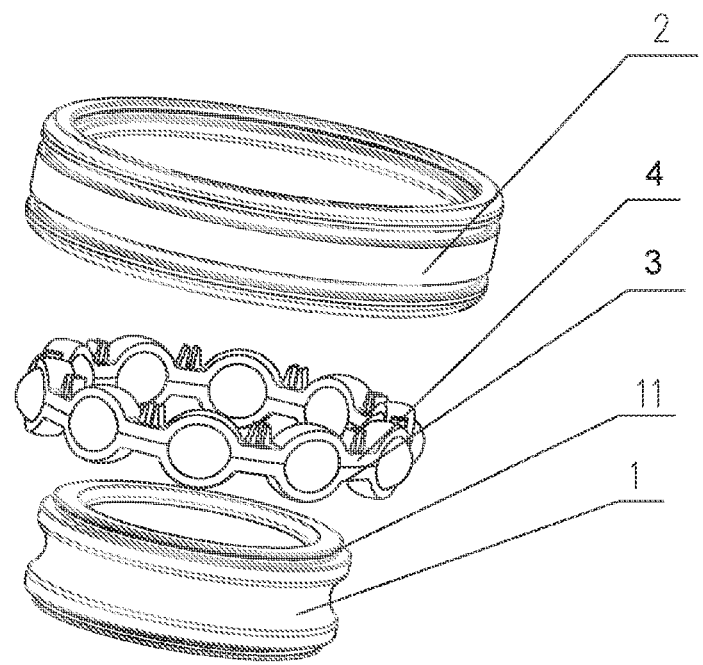
FIG. 9 is an exploded perspective view according to a second embodiment of the present disclosure.

The hook 47 is provided in a wedge shape. A contact surface of the hook 47 and the insertion groove is an inclined surface. The connecting portion 42 on the lower cage body 3 is lower than the bottom of the pocket groove 41. The length of the hook 47 is less than the distance between the connecting portion 42 and the bottom of the pocket groove 41. A first connecting step is provided on the inner wall of the outer ring 2. Second connecting step 11 is provided on the outer wall of the inner ring 1. Dust cover 5 is clamped between the first connecting step and the second connecting step 11. In FIG. 8, (there is no connecting bridge 48 provided) between the insertion piece 43 and the connecting portion 42. In FIG. 9, the outer ring 2 and the inner ring 1 are shown without a dust cover 5.

The above embodiment is just one of the preferred specific embodiments of the present disclosure, and various variations and substitutions made by those skilled in the art within the scope of the technical solution of the present disclosure shall all be included in the protection scope of the present disclosure.

What is claimed is:

1. A deep groove ball bearing with a cage, comprising an outer ring, an inner ring, the cage, and steel balls, wherein the cage is provided between the outer ring and the inner ring, pockets are formed in the cage, the steel balls are placed in the pockets, the cage is split into an upper cage body and a lower cage body, pocket grooves are formed alternately in each of the upper cage body and the lower cage body, pocket grooves in the upper cage body and the lower cage body are combined correspondingly to form the pockets, a connecting portion is provided between adjacent pocket grooves in the lower cage body, a positioning portion is provided between adjacent pocket grooves in the upper cage body, an insertion piece and an insertion groove are provided between the connecting portion and the positioning portion, the insertion piece and the insertion groove are configured to be fixed with each other to form a fixed connection between the lower cage body and the upper cage body; wherein the insertion groove is formed in the positioning portion of the upper cage body, a bump is provided in the insertion groove, the insertion piece is provided on the connecting portion of the lower cage body, a clamping member is provided on an end portion of the insertion piece, the clamping member is clamped between the bump and a bottom of the insertion groove; wherein the bump is arranged adjacent to an inserting port of the insertion groove; wherein a positioning piece being respectively provided on opposite sides of the insertion piece, each of the positioning pieces being elastic, and an accommodating groove is formed in a position within the insertion groove on opposite sides thereof and corresponding to each of the positioning pieces; wherein the insertion groove communicates with the pocket groove through the accommodating groove, and an oil storage cotton is provided within the accommodating groove.

2. The deep groove ball bearing with the cage according to claim 1, wherein a first connecting step is provided on an inner wall of the outer ring, a second connecting step is provided on an outer wall of the inner ring, and a dust cover is clamped between the first connecting step and the second connecting step.

* * * * *